United States Patent [19]

Avillez de Basto

[11] Patent Number: 5,072,963

[45] Date of Patent: Dec. 17, 1991

[54] RECREATION BOAT/TRAILER VEHICLE

[76] Inventor: Luiz J. M. Avillez de Basto, R. Anunze 303, Sao Paulo, Brazil

[21] Appl. No.: 538,756

[22] Filed: Jun. 15, 1990

[51] Int. Cl.$^5$ .............................................. B60P 3/10
[52] U.S. Cl. ............................... 280/414.1; 296/157; 296/182; 296/37.6
[58] Field of Search ...................... 296/157, 182, 37.6, 296/37.1; 280/414.1, 415.1

[56] References Cited

U.S. PATENT DOCUMENTS

| | | | |
|---|---|---|---|
| 2,310,431 | 2/1943 | Hart | 296/157 |
| 3,885,693 | 5/1975 | Haptonstall | 296/157 X |
| 4,159,844 | 7/1979 | Weiner | 296/37.1 |
| 4,820,111 | 4/1989 | Godbersen | 280/414.1 X |
| 4,906,033 | 3/1990 | Sargent et al. | 296/37.1 X |

FOREIGN PATENT DOCUMENTS

| | | | |
|---|---|---|---|
| 623092 | 7/1961 | Canada | 296/157 |
| 2633232 | 12/1989 | France | 296/157 |

Primary Examiner—Kenneth R. Rice
Assistant Examiner—Alan M. Kagen
Attorney, Agent, or Firm—Malloy, Downey & Malloy

[57] ABSTRACT

A combined trailer home and boat assembly adapted to be towed behind a motor vehicle comprising a trailer having a frame structure supported on a plurality of wheels and including a support cradle for supporting a boat in a stowed position. A super structure is mounted in at least partially surrounding relation to the support cradle on the trailer wherein the super structure is dimensioned and configured to conform with the outer configuration of the boat in such a manner as to present the appearance of a unitary, aero-dynamically designed structure whereby the combined assembly is intended to be used as a recreational vehicle, such as a trailer home or like vehicle.

25 Claims, 4 Drawing Sheets

RECREATION BOAT/TRAILER VEHICLE

BACKGROUND OF THE INVENTION

1. Field of the Invention

The present invention is directed to a multi-purpose recreational vehicle adapted to be towed by a towing vehicle, and more specifically, to a combination boat and trailer assembly wherein the combined assembly functions as a trailer home; the boat being separable therefrom for independent use.

2. Description of the Prior Art

The use of trailers to carry and transport boats is well known in the art. Further, recreational vehicles of the type which are adapted to be towed behind a towing vehicle to a campground or like recreational facility are also well known and extremely common in the prior art. Often, these recreational vehicles are towed to a campground near a lake, river or other body of water at which place the user sets up a campsite. Because many recreational vehicle users also enjoy boating when camping at a site near the water, it is often desirous to take along a boat for use as an additional source of recreational enjoyment while camping However, transport of these accessories leads to the problem of having to tow multiple units which is, of course, a dangerous and possibly illegal task.

In an attempt to fulfill the needs of campers and boaters alike, many vehicles have been developed in the prior art which provide for the combination of a recreational vehicle such as a camper or trailer home with a boat. One such vehicle is disclosed in U.S. Pat. No. 4,869,545, to Notermann, which discloses a recreational vehicle having the ability to carry an accessory vehicle such as a boat within an interior living space during transport of the vehicle. When the user arrives at the campsite, the boat would be removed from the interior living space and a floor portion is lowered from a top stored position to a bottom operable position wherein the interior of the vehicle can be fully utilized for living space. A similar combination camper and boat vehicle is disclosed in U.S. Pat. No. 3,486,786, to Howarth, which is directed to a combination camper and boat vehicle for carrying living quarters for campers and a boat including a wheel carriage for supporting the boat wherein a removable portion is retractable within the living quarters for providing space to receive the boat and carriage.

Other combination camper and boat vehicles developed in the prior art in an attempt to fulfill the above-noted needs include the patent to Platt, U.S. Pat. No. 3,522,967. The invention in Platt is directed to a transportable house which is suitable for use as either a pickup camper for placement on a pickup truck or a boat. When mounted on a pickup, the transportable house is affixed to the sidewalls of the flatbed of the truck wherein a combination roof and hull functions as a roof for the house. When the house is tipped over and oriented for use as a boat, the combination roof and hull functions as a boat hull. While the invention, as disclosed in Platt, is useful as both a camper and a boat, there are numerous problems associated with the transportable house structure. First, the use of the transportable house on a pickup truck is not a highly desirous living unit and certainly does not measure up to today's standards for recreational vehicles. When used as a boat, the entire house structure is inverted upside-down in such a manner as to require removal of all loose items within the house. Additionally, the hull design is in no way sufficient to meet today's boating standards.

Finally, U.S. Pat. No. 3,885,693, to Haptonstall, discloses a combination vehicle and boat assembly which includes a prime mover resembling a flatbed truck having a cradle to positionably support a boat thereon. The boat and the prime mover are configured so as to fare into each other providing a unitary appearance. The invention in Haptonstall is primarily directed to eliminating the problem of towing a trailer and boat assembly by combining a motor vehicle and boat into one unitary vehicle. The prime mover, resembling a flatbed truck, is designed to support a specific boat thereon and thus, would not be useful in combination with other boats having a different shape or structure. Further, there is no disclosure in the Haptonstall patent of using the combination vehicle as a recreational vehicle such as a motor home.

Accordingly, there still exists a need in the art for a recreational vehicle which is adapted to be towed behind a towing vehicle to a camping site wherein the vehicle functions as both a trailer home and a boat. More specifically, there is a need for a boat trailer which is specifically structured and dimensioned to carry and support a boat thereon in such a manner as to provide a unitary, aero-dynamic appearance and including interrelating structural features such that the combined assembly functions as a trailer home with the boat being separable for independent use.

SUMMARY OF THE INVENTION

The present invention is directed to a multi-purpose recreational vehicle comprising the combination of a boat and supporting trailer wherein the vehicle is useful as both a trailer home and a watercraft when the boat is removed from the trailer. Specifically, the present invention includes a trailer having a frame structure supportably mounted to at least one transverse axle having wheels attached at opposite ends. The frame structure includes an upper side having a support cradle mounted thereto being specifically structured to supportably receive a boat thereon.

The trailer further includes a surrounding super structure mounted to the upper side of the frame extending around the sides and fronts of the trailer in surrounding relation to the support cradle. The super structure is dimensioned and configured so as to blend with or conform to the outer configuration of a boat supported in the cradle in such a manner as to provide a unitary, aero-dynamic appearance. Accordingly, when a boat is supported in a stowed position in the support cradle, the combined trailer and boat assembly has the appearance of a modern recreational type vehicle.

To further enhance the appearance and function of the vehicle, headlights are provided on the front bumper area of the super structure having a similar appearance to headlights as found on most modern automobiles. Additionally, taillights are provided at the rear of the super structure on opposite sides in accordance with the laws requiring towed vehicles to have brake lights and taillights.

In order to provide access to an interior living space, when used as a trailer home, a preferred style of boat would include a side door vertically aligned with a retractable staircase integrally constructed within a sidewall of the super structure.

The surrounding super structure further includes extensive storage space including a large storage compartment at the nose of the trailer. A hinged door forming a portion of the nose section is movable between an open and closed position to provide access to the storage compartment wherein various camping supplies and water sport equipment can be stored.

Accordingly, the combination vehicle of the present invention is intended to fulfill the needs of recreational vehicle owners, campers, and boaters alike. In use, the combination boat and trailer assembly can be towed to a suitable camping site such as along a river or aside a lake at which place, the towed vehicle can be parked. With the boat in its supported, stowed position on the trailer, the entire assembly functions as an ideal modern-day trailer home When the user desires to go boating, the trailer is simply backed into the water so that the boat can be slidably removed therefrom. In this manner, with the trailer at least partially submerged in the water, the boat can easily slide on and off of the trailer so as to float freely therefrom. After boating, the boat is replaced in its stowed position on the cradle of the trailer where the entire assembly is once again useful as a trailer home.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
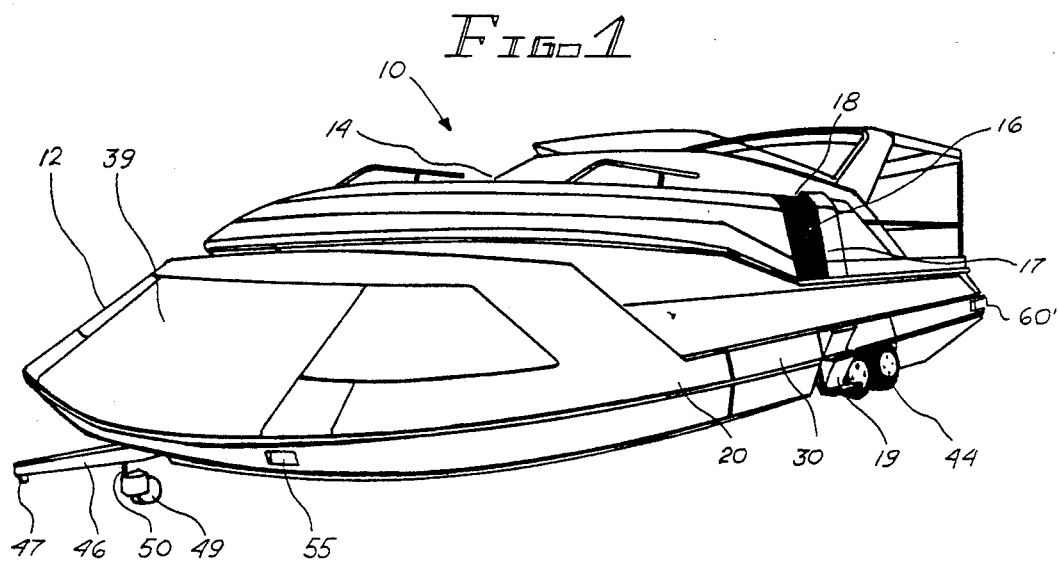
FIG. 1 is a perspective view of a preferred embodiment of the combined boat and trailer assembly of the present invention.
Figure 2:
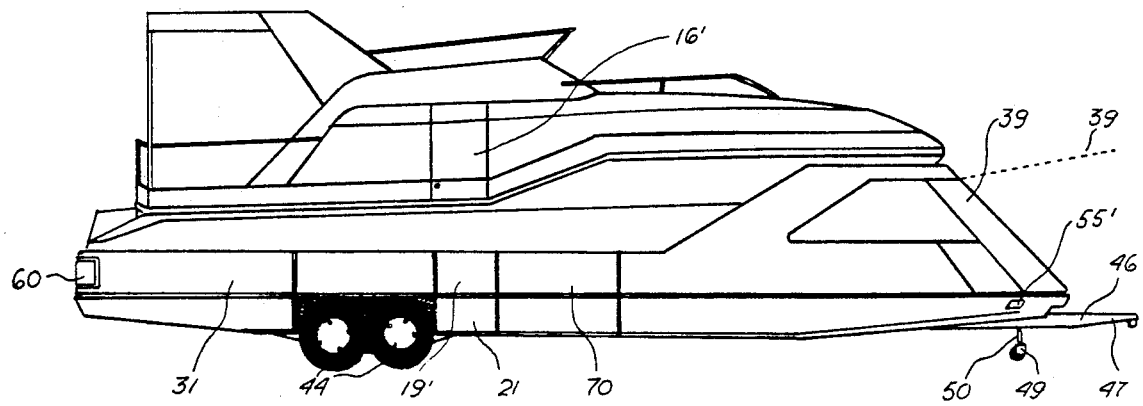
FIG. 2 is a side plan view of a preferred embodiment of the combined boat and trailer assembly of the present invention.

As illustrated in FIGS. 1 through 9, the present invention is directed towards a recreational vehicle or more specifically, a combination trailer home and boat assembly generally indicated as 10 comprising a trailer 12 and boat 14, as shown in FIG. 1. The trailer 12 includes a super structure 20, to be described in more detail hereinafter, having an overall outer configuration generally adapted to conform with the outer configuration of the boat 14 when stowed on the trailer whereby the combination of the boat and trailer has the appearance of a unitary, aero-dynamically designed recreational vehicle. The boat 14 includes an interior living space which is accessible through a number of doors including opposite side doors 16 and 16' which are slidably mounted to the side of the boat so as to move between an open and closed position. The doors 16 and 16' each include a door opening as at 17 being generally dimensioned so as to include an inwardly angled top portion 18 to provide for increased head clearance when entering and exiting the interior living space of the boat. To further facilitate entering and exiting the interior living space of the boat, a pair of retractable staircases 19 and 19' are located on each side of the super structure 20 of the trailer so as to be in vertical alignment with the door opening 17 when the boat is in a stowed position. The retractable staircases 19 and 19' are pivotally mounted to the super structure 20 so as to swing between an open operable position, as seen in FIG. 1, and a closed stored position, as shown in FIG. 2. In the stored position, the backing 21 of the staircases 19 and 19' is designed to be flush with the surrounding super structure 20.

Figure 3:
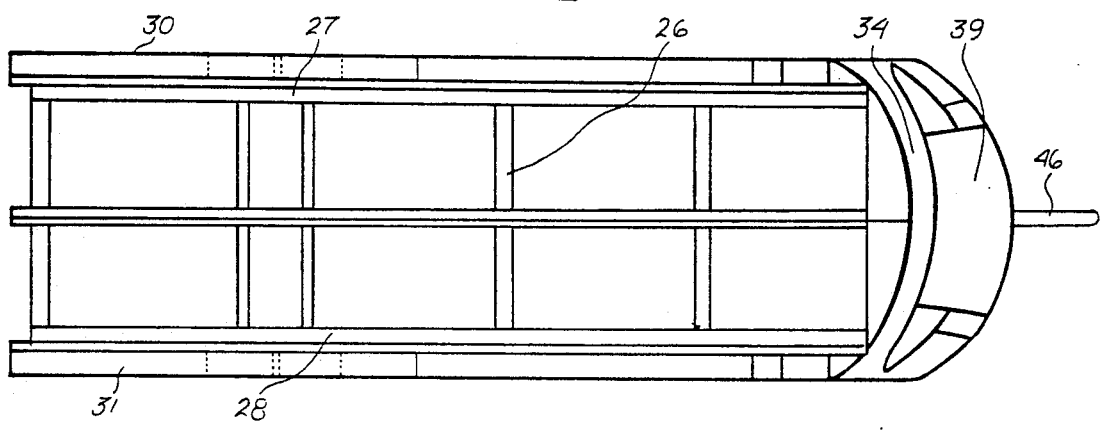
FIG. 3 is a top plan view of a preferred embodiment of the trailer of the present invention.

With reference to FIG. 3, a preferred embodiment of the present invention includes the trailer having a frame structure 26 including a support cradle mounted thereto. The support cradle includes two longitudinally extending side supports 27 and 28 and a longitudinally extending centerline support 29. The side supports 27 and 28 are specifically structured and disposed so as to support the hull sides of the boat 14 when the boat is supported in the stowed position on the trailer. Additionally, the centerline support 29 is dimensioned and disposed so as to support the boat 14 along a centerline of the boat's hull when in the stowed position.

The super structure 20 is preferably formed of fiberglass and is mounted to an upper side of the frame 26 in partially surrounding relation to the support cradle and includes a sidewall structure including two oppositely disposed vertically extending sidewalls 30 and 31 which extend upwardly from the frame 26 and are dimensioned and configured so as to surround a lower hull portion of the boat providing a uniform appearance along the sides of the boat and trailer combination. The front of the super structure 20 includes a nose portion 34 extending around a front end of the trailer and connecting between the opposite sidewalls 30 and 31. The front nose portion 34 is dimensioned so as to upwardly extend from the frame 26 of the trailer at an angle generally conforming with the upper bow configuration of the boat in such a manner as to provide a uniform, aero-dynamically styled appearance.

Figure 4:
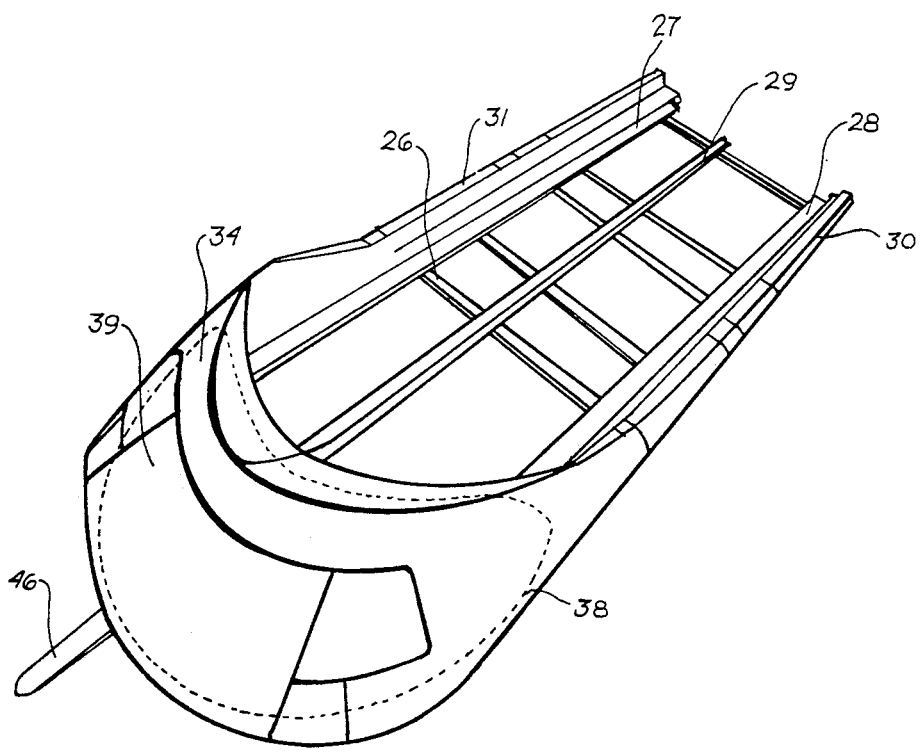
FIG. 4 is a perspective view of a preferred embodiment of the trailer of the present invention.

The super structure further includes a number of storage compartments including a nose storage compartment formed in an interior chamber of the nose portion of the super structure as indicated by the broken lines 38 shown in FIG. 4. A compartment door 39 is hingedly attached to the super structure in covering relation to the nose compartment and is movable between an open and closed position, as shown in FIG. 2, to provide access to the interior storage compartment 38.

Figure 5:
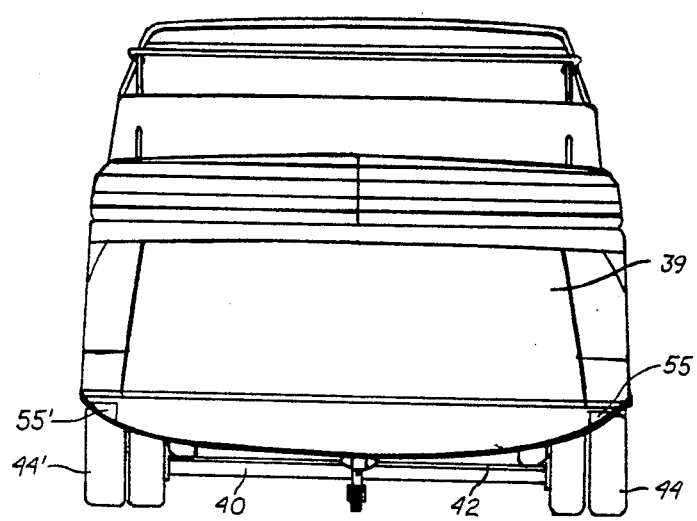
FIG. 5 is a front plan view of a preferred embodiment of the combined boat and trailer assembly of the present invention.
Figure 6:
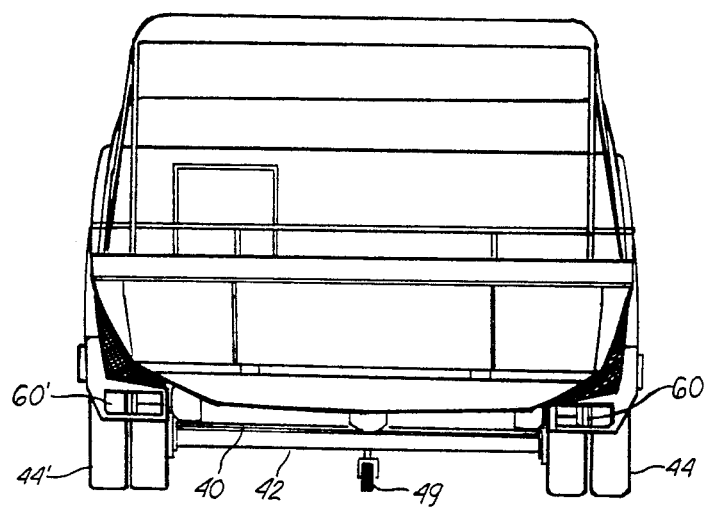
FIG. 6 is a rear plan view of the combined boat and trailer assembly of the present invention.
Figure 7:
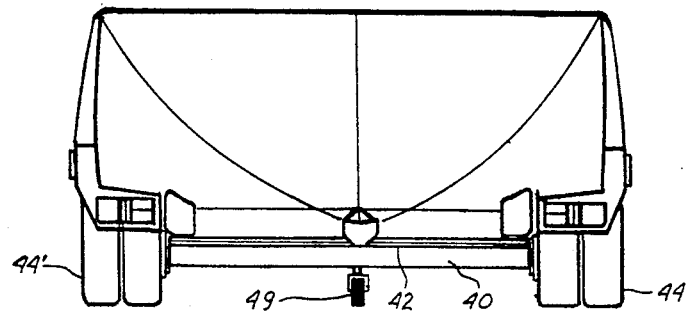
FIG. 7 is a rear plan view of a preferred embodiment of the trailer of the present invention.

With reference to FIGS. 5 through 7, the frame 26 of the trailer is supportably mounted on a pair of transverse axles 40 and 42 extending across the width of the trailer and including a pair of wheels 44 and 44' attached at the opposite ends of the axles 40 and 42. Additionally, the frame structure includes an elongate stem 46 extending from a front end of the trailer including a bumper hitch receiving socket 47 for attachment to a bumper hitch on a towing vehicle for towing of the boat and trailer combination. Additionally, a nose wheel 49 extends down from the elongate stem 46 in supporting relation to the front end of the trailer. The nose wheel 49 is pivotally attached to a connecting arm 50 extending between the nose wheel 49 and the elongate stem 46.

In a preferred embodiment, the super structure 20 includes a pair of headlights 55 and 55' on a lower front surface of the nose portion 34. Additionally, the super structure includes a taillight assembly 60 and 60' mounted on opposite sides of the rear end of the super structure. The taillight structure 60 and 60' includes a combination of taillights, brake lights and signal lights.

In addition to the front nose compartment 38, the super structure further includes side compartments as at 70 built within the sidewalls 30 and 31 including access doors formed within the outer sidewall construction so as to conform with the outer configuration thereof.

Figure 8:
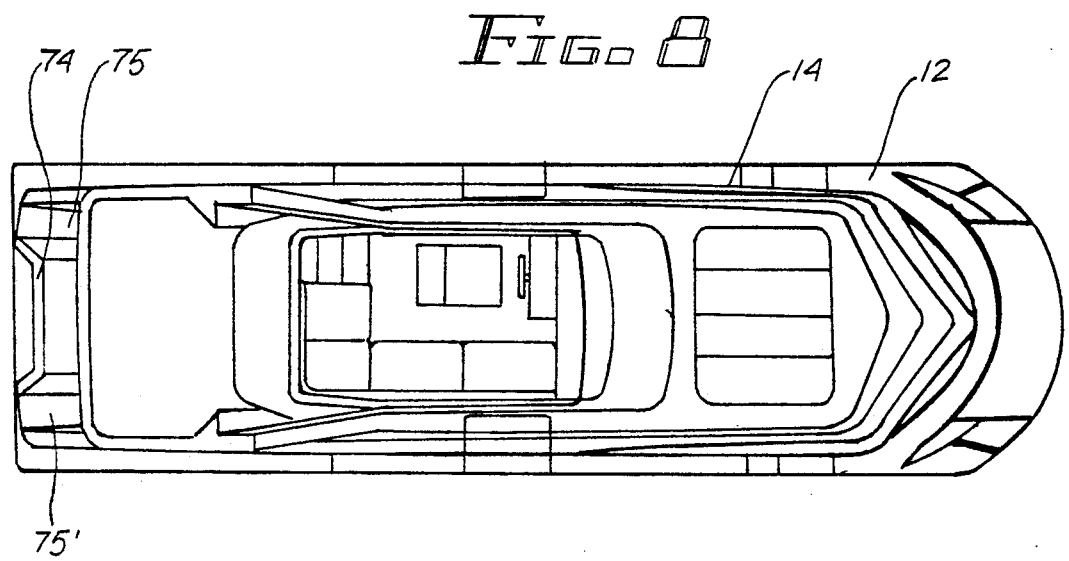
FIG. 8 is a top plan view of a preferred embodiment of the combination boat and trailer assembly of the present invention.

Referring to FIG. 8, it is seen that the boat 14 and trailer 13 are generally configured so as to blend with each other providing a uniform appearance. In a preferred embodiment, the stern of the boat includes a swim platform 74 including side steps 75 and 75' which further assists entering and exiting the boat when supported in the stowed position on the trailer.

Figure 9:
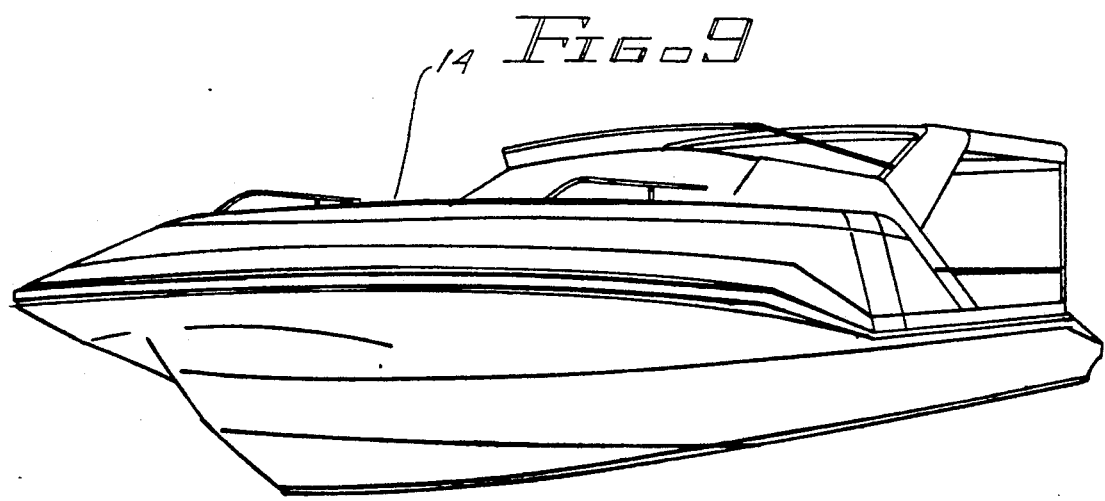
FIG. 9 is a perspective view of a preferred embodiment of a boat to be used in combination with the trailer of the present invention.

FIG. 9 illustrates a preferred embodiment of a boat generally adapted to fit on the trailer 12 in such a manner as to conform with the outer configuration of the super structure 20. It should be noted that other boat styles can be used within the scope and spirit of the invention so long as they are generally adapted to conform with the dimensions of the trailer.

What is claimed is:

1. For use in camping and boating, a combination trailer home and boat assembly adapted to be towed by a towing vehicle, the assembly comprising:
   a trailer including a frame structure supported on at least one transverse axle having wheels attached at opposite ends, said trailer further including attachment means for attaching said trailer to a trailer hitch on the towing vehicle,
   a support cradle mounted to an upper side of said frame structure and structured and disposed to facilitate sliding receipt and removal of a boat thereon,
   said boat adapted to be removably carried in a stowed position on said support cradle and including entrance means to facilitate entering and exiting an interior living space within said boat,
   a super structure formed of fiberglass or other suitable material and mounted to said trailer in at least partially surrounding relation to said support cradle, said super structure being dimensioned and configured to conform with an outer configuration of said boat to present the appearance of a unitary, aero-dynamically designed vehicle when said boat is in the stowed position,
   said super structure including a vertically extending side wall structure disposed in at least partially surrounding relation to said support cradle and including two oppositely disposed side walls extending longitudinally along opposite sides of said frame structure and a nose portion disposed on a front end of said frame structure and connecting between said opposite side walls, said side wall structure dimensioned and configured to extend substantially vertically upward from said frame structure in at least partially covering relation to sides of a hull portion of said boat, substantially conforming with the outer configuration thereof,
   said super structure further including at least one retractable staircase assembly disposed in aligned relation with said entrance means on said boat to further facilitate entering and exiting said interior living space within said boat,
   storage means including a nose compartment disposed within an interior chamber of said nose portion of said super structure, and including an access door hingedly attached to said super structure and defining an outer surface of said nose portion, and
   whereby said assembly is useful as a trailer home on land with the interior living space being readily accessible and useful with said boat in the stowed position and whereby said boat is independently useful as a water craft when removed from said trailer.

2. An assembly as in claim 1 wherein said trailer includes two transverse axles disposed in supporting relation beneath said frame structure, each of said transverse axles including a pair of wheels attached at each opposite end thereof.

3. An assembly as in claim 2 wherein said attachment means on said trailer further includes an elongate stem extending from said frame structure and including a trailer hitch receiving socket adapted for interconnection with the trailer hitch on the towing vehicle.

4. An assembly as in claim 1 wherein said boat is generally dimensioned and configured to conform with said super structure so as to present a uniform, aero-dynamically designed appearance.

5. An assembly as in claim 1 wherein said support cradle includes a pair of longitudinally extending side supports mounted to an upper side of said frame and structured and disposed to support said boat along a side of the boat's hull.

6. An assembly as in claim 5 wherein said support cradle further includes a longitudinally extending centerline support mounted to an upper side of said frame and structured and disposed to support said boat along a centerline of the hull.

7. An assembly as in claim 1 wherein said nose portion is dimensioned and configured to slope upwardly from said frame so as to fair with the outer configuration of an upper bow of the boat.

8. An assembly as in claim 7 wherein said nose compartment extends at least partially into an interior of said sidewall structure.

9. An assembly as in claim 8 wherein said storage means further includes side compartments formed within said interior of said sidewall structure and including access means on said sidewall structure to facilitate access thereto.

10. An assembly as in claim 1 wherein said trailer further includes a nose wheel pivotally mounted to said elongate stem in supporting relation below said front end of said trailer.

11. An assembly as in claim 1 wherein said trailer further includes a rear end being structured and configured to allow said boat to be slidably removed from said trailer.

12. An assembly as in claim 11 wherein said opposite sidewalls of said super structure include tail ends disposed at said rear end of said trailer, each of said tail ends including a taillight assembly mounted thereto.

13. An assembly as in claim 12 wherein said trailer further includes a pair of headlights mounted within said nose portion of said super structure.

14. For use in carrying and transporting a marine craft, a trailer adapted to be towed by a towing vehicle, comprising:
   a frame structure supported on at least one transverse axle having a plurality of wheels attached at opposite ends thereof,
   a support cradle mounted to an upper side of said frame structure dimensioned and disposed to support the marine craft thereon,
   a super structure mounted to said upper side of said frame structure in at least partially surrounding relation to said support cradle, said super structure being dimensioned and configured to conform with an outer configuration of the marine craft when supported on said support cradle so as to present a unitary, aero-dynamically designed appearance,
   said super structure including a vertically extending side wall structure disposed in at least partially surrounding relation to said support cradle and including two oppositely disposed side walls extending longitudinally along opposite sides of said frame structure and a nose portion disposed on a front end of said frame structure and interconnecting between said opposite side walls, said side wall structure dimensioned and configured to extend substantially vertically upward from said frame structure in at least partially covering relation to sides of a hull portion of the marine craft so as to substantially conform with the outer configuration thereof,
   storage means including a nose compartment disposed within an interior chamber of said super structure, and including an access door hingedly attached to said super structure and defining an outer surface of said nose portion,
   attaching means on said frame structure for attaching said trailer to a towing hitch on the towing vehicle, and
   whereby the marine craft is useful as a trailer home when supported on said support cradle and further whereby the marine craft can be removed therefrom for independent use.

15. A trailer as in claim 14 wherein said attachment means includes an elongate stem extending from said frame structure and including a trailer hitch receiving socket adapted for interconnection with the trailer hitch on the towing vehicle.

16. A trailer as in claim 15 wherein support cradle includes a pair of longitudinally extending side supports mounted to said upper side of said framed structure and disposed in supporting relation to the marine craft.

17. A trailer as in claim 16 wherein said includes a longitudinally extending centerline support mounted to said upper side of said frame structure and disposed to support the centerline of the marine craft.

18. A trailer as in claim 17 wherein said nose portion is dimensioned and configured to slope upwardly from said frame as so to fair with the outer configuration of the upper bow of the marine craft.

19. A trailer as in claim 18 wherein said nose compartment extends at least partially into an interior of said sidewall structure.

20. A trailer as in claim 19 wherein said storage means further includes side compartments formed within said interior of said sidewall structure and including access means on said sidewall structure to facilitate access thereto.

21. A trailer as in claim 20 wherein said trailer further includes a nose wheel pivotally mounted to said elongate stem in supporting relation below said front end of said trailer.

22. A trailer as in claim 21 further including a rear end being structured and configured to allow the marine craft to be slidably removed from said trailer.

23. A trailer as in claim 22 wherein said opposite sidewalls of said super structure include tail ends disposed at said rear end of said trailer, each of said tail ends including a taillight assembly mounted thereto.

24. A trailer as in claim 23 further including a pair of headlights mounted within said nose portion of said super structure.

25. For use in carrying and transporting a craft, a trailer adapted to be towed by a towing vehicle, comprising:
   a frame structure supported on at least one transverse axle having a plurality of wheels attached at opposite ends thereof,
   a support cradle mounted to an upper side of said frame structure dimensioned and disposed to support the craft thereon,
   a super structure mounted to said upper side of said frame structure in at least partially surrounding relation to said support cradle, said super structure being dimensioned and configured to conform with an outer configuration of the craft when supported on said support cradle so as to present a unitary, aero-dynamically designed appearance,
   said super structure including a vertically extending side wall structure disposed in at least partially surrounding relation to said support cradle and including two oppositely disposed side walls extending longitudinally along opposite sides of said frame structure and a nose portion disposed on a front end of said frame structure and interconnecting between said opposite side walls, said side wall structure dimensioned and configured to extend substantially vertically upward from said frame structure in at least partially covering relation to sides of the craft so as to substantially conform with the outer configuration thereof,
   storage means including a nose compartment disposed within an interior chamber of said super structure, and including an access door hingedly attached to said super structure and defining an outer surface of said nose portion,
   attaching means on said frame structure for attaching said trailer to a towing hitch on the towing vehicle, and
   whereby the craft can be carried on said trailer for transport thereof, and the craft being removable from said trailer for independent use.

* * * * *